July 24, 1962
H. B. NELSON ET AL
3,046,455
VOLTAGE MONITOR
Filed Dec. 9, 1958
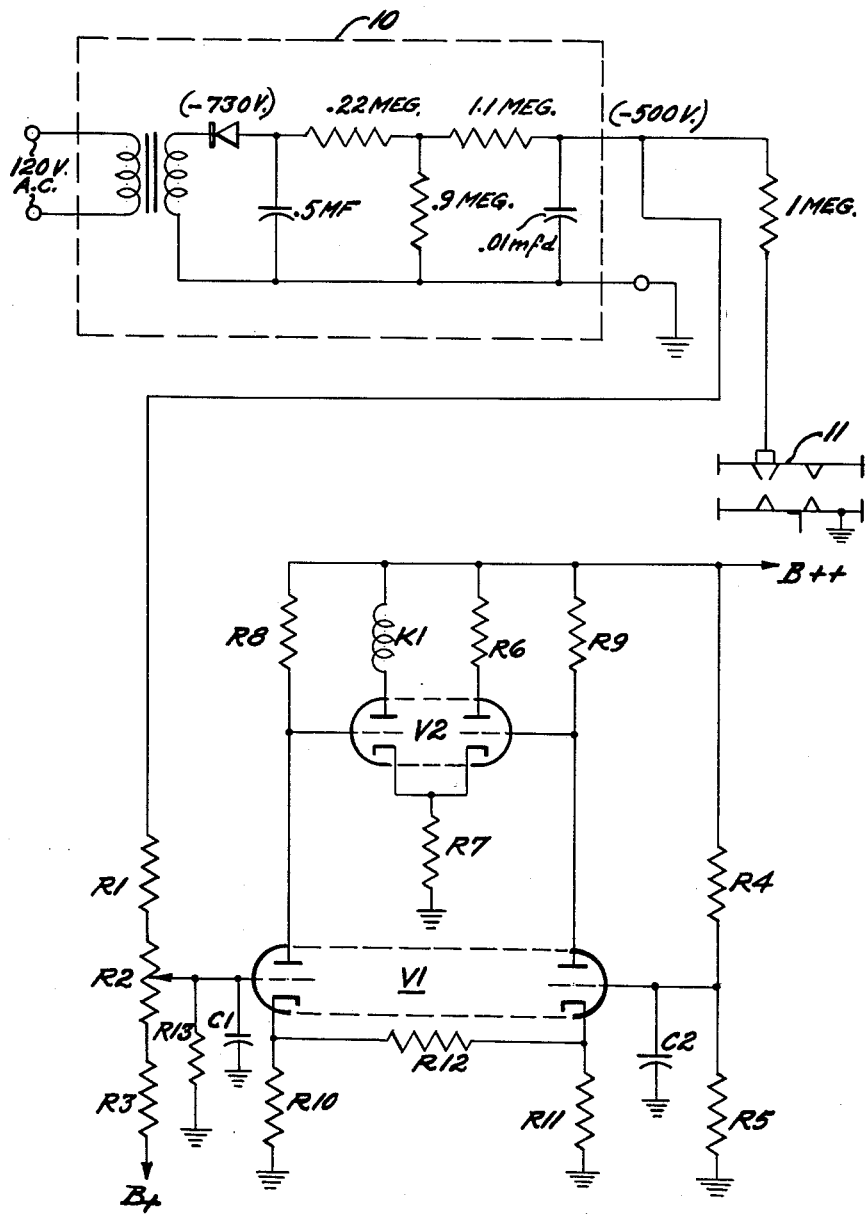
INVENTORS
HAROLD B. NELSON
AND FLOYD R. SCRIPTURE
BY
*Wade Lowry*
*Sherman H. Goldman*
ATTORNEYS

United States Patent Office 3,046,455
Patented July 24, 1962

3,046,455
VOLTAGE MONITOR
Harold B. Nelson, Natick, and Floyd R. Scripture, Stoughton, Mass., assignors to the United States of America as represented by the Secretary of the Air Force
Filed Dec. 9, 1958, Ser. No. 779,263
2 Claims. (Cl. 317—149)

This invention relates to monitoring devices and has particular reference to a means for monitoring a voltage.

The device of this invention is intended to be used with monitors of various components or circuits of a radar or other electronic system to form an automatic failure prediction system whereby impending equipment failure may be recognized before an actual shutdown of the monitored equipment is necessary. Upon recognition of imminent failure, standby units may be substituted or repairs made, thereby enabling a substantially continuous operation of the equipment. Reliability of the monitored components may be considered to be increased because components will be replaced prior to actual failure. Furthermore, monitoring enables complete analysis of system operation which facilitates improvement of equipment design or compensation in operation to enhance the equipment reliability. To accomplish the purposes of monitoring it is necessary to design the monitor with a reliability which is greater than the equipment to be monitored.

Accordingly, it is an object of the invention to produce a voltage monitor which is extremely reliable.

It is also an object of this invention to produce an improved voltage monitor.

It is still another object of this invention to produce a monitoring unit which enables substantially continuous operation of monitored equipment by producing a signal on impending circuit failure.

It is a further object of this invention to produce a monitoring unit which utilizes conventional, currently available components that lend themselves to standard mass production manufacturing techniques.

These and other advantages, features and objects will become more apparent from the following description taken in connection with the illustrative embodiment in the accompanying drawing wherein the FIGURE is a schematic representation of a simplified voltage monitoring circuit used to monitor a keep-alive power supply for a TR tube.

Referring to the FIGURE, the voltage monitor is described relative to a keep-alive power supply 10 for a TR tube 11 wherein it is desired to monitor the voltage drop. The voltage to be measured is taken from the power supply side of a decoupling resistor in order to avoid adding capacitance to the TR electrodes which could cause the tube to go into relaxation oscillation. The voltage at this point is proportional to the electrode drop in the TR tube because of the finite internal impedance of the power supply 10. A voltage divider R1, R2, R3 receives the voltage to be monitored and a B+ voltage. The voltage divider constants are so selected that a voltage at the volt meter grid of tube V1 is only a few volts. A reference voltage is supplied by a B++ potential applied through voltage divider resistors R4 and R5 to a second section of V1. A change in voltage at the voltmeter grid acts to close the relay K1 when the voltmeter grid voltage is equal or more negative than the reference grid. This is accomplished by dual triode tube V2. V1 acts as a difference amplifier such that the difference in voltage at the grids of V2 are proportional to the difference in voltage at the grids of V1 with phase inversion. V2 tends to proportion the current through both of its sections. The plate circuit of each of the triodes of V2 are connected through equal resistances to the B++ line by means of relay coil resistance K1 in the relay amplifier of V2 and resistor R6 in the remaining side of V2. The cathodes of each of the dual triodes are connected together and to resistor R7 to ground. The plates of each section of V1 are connected to a triode of V2, as shown, hence through equal resistances R8 and R9 to the B++ supply. Cathode resistances R10 and R11, interconnecting resistor R12, which gives some cathode feedback to reduce the effect of tube variations on circuit performance, and grid resistor R13 and grid capacitors C1 and C2 complete the circuit.

Although the invention is not limited thereto, a list of representative values of components that may be used follows:

| | | | |
|---|---|---|---|
| V1 | 5814. | R9 | 100K. |
| V2 | 5965. | R10 | 15K. |
| R1 | 50 meg. | R11 | 15K. |
| R2 (Pot.) | 1 meg. | R12 | 36K. |
| R3 | 9 meg. | R13 | meg. |
| R4 | 10 meg. | C1 | 0.15 mfd. |
| R5 | 750K. | C2 | 1.0 mfd. |
| R6 | 5K. | K1 (relay coil) | 5K. |
| R7 | 15K. | B+ | 120 v. |
| R8 | 100K. | B++ | 150 v. |

Utilizing the above listed circuit constants a 12 volt bias is generated at the grid of the voltmeter circuit. When the input of this circuit exceeds a preset value, relay K1 is activated. In normal operation of the keep-alive power supply and TR tube circuit, the voltage drop normally decreases with use of the circuit and, prior to failure, increases rapidly. By setting the relay operation at a predetermined increase, impending failure of the equipment may be averted by preventative repair or replacement, thus increasing the effective reliability of the circuit. The left sides of V1 and V2 and the right sides of these tubes are biased such that approximately equal or a negative voltage at the voltmeter grid of V1 tends to cause a heavy current through the relay coil K1 for operation of the relay; however, when the voltmeter grid of V1 is positive with respect to the reference grid, the biasing arrangement and operation of the right side of V2 tends to limit current flow through the relay. Adjustment of potentiometer R2 allows for variation in the amount of voltage change in the circuit necessary for activation of the relay. Line voltage changes may be compensated for by using a reference voltage which is a function of the line voltage and a partially regulated voltage, for example, by a neon regulator for the positive return of the voltage divider which feeds the voltmeter grid. The time constants in the voltmeter grid circuit and the reference grid circuit should be made equal so that rapid transients in line voltage will be filtered out and not cause momentary relay action.

Although the invention has been described with reference to particular embodiments, it will be understood to those skilled in the art that the invention is capable of a variety of alternative embodiments within the spirit and scope of the appended claims.

We claim:
1. A means for indicating a voltage change greater than a predetermined amount comprising a pair of tubes, each having a cathode, anode and control grid, means for applying a voltage to the control grid of one of said tubes, means for applying the output of said one of said tubes to the control grid of the other of said tubes, relay means in the anode circuit of the other of said tubes, a second pair of tubes, each having a cathode, anode and control grid, a single source of potential for the anode circuits of all four of said tubes, means for applying a reference voltage to the control grid of one of said second pair of tubes, said means including the said single source of potential that supplies the anode circuits of all four of said paired tubes, means for applying the output of said one of said second pair of tubes to the control grid of the other of said second pair of tubes, resistance means in the anode circuit of the other of said second pair of tubes, and means interconnecting the cathodes of the said ones of said pairs of tubes and the said others of the said pairs of tubes, the relation between said voltages being such that said relay has a low threshold differential for rapid opening and closing of said relay and is operated by current flow through it only when said voltage is about equal to or negative with respect to said reference voltage.

2. A voltage monitor for activating a relay when the input exceeds a preset value comprising input means for receiving a voltage to be monitored, a pair of triodes, each having a cathode, anode and control grid, means for applying said voltage to the control grid of one of said triodes, means for applying a reference voltage to the control grid of the other of said triodes, resistance means between the cathodes of said triodes, a second pair of triodes, each having an anode, cathode and control grid, means connecting the anode of the said one of said first-mentioned triodes with a control grid of one of said second-mentioned triodes, means connecting the anode of the said other of said first-mentioned triodes with the control grid of the other of said second-mentioned triodes, means connecting the cathodes of said second-mentioned triodes together, a single source of potential for the anode circuits of all four of said triodes, said single source of potential being also the source of the reference voltage utilized by said reference voltage-applying means, relay means in the anode circuit of the said one of said second-mentioned triodes, and resistance means in the anode circuit of the said other of said second-mentioned triodes, the parameters and voltages applied to said triodes being so arranged that said relay has a low threshold differential for rapid opening and closing of said relay and operates when said voltage to be monitored is about equal to or negative with respect to said reference voltage.

References Cited in the file of this patent

UNITED STATES PATENTS

| | | |
|---|---|---|
| 2,577,147 | Oberman et al. | Dec. 4, 1951 |
| 2,603,689 | Stevens et al. | July 15, 1952 |
| 2,676,286 | Buchner | Apr. 20, 1954 |
| 2,902,600 | Coffin | Sept. 1, 1959 |